UNITED STATES PATENT OFFICE 2,690,441

3-CARBOLINE DERIVATIVES

Robert R. Burtner, Skokie, Ill., assignor to G. D. Searle & Co., Chicago, Ill., a corporation of Illinois No Drawing. Application June 11, 1953, Serial No. 361,065

11 Claims. (Cl. 260—294)

This invention relates to dialkylaminoalkamidocarbolines, their acid addition and quaternary ammonium salts, and processes for the manufacture of these carbolines and their salts. In particular, this invention relates to 3-carboline derivatives of the formula

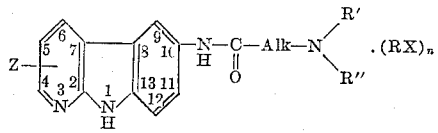

wherein Z is hydrogen or a methyl radical; Alk is a lower alkylene radical containing not more than 3 carbon atoms; R is hydrogen, or a lower alkyl radical containing not more than 4 carbon atoms; NR'R'' is either a lower dialkylamino radical or a nitrogen-containing heteromonocyclic radical; X is one equivalent of an anion; and $n$ is either zero (where the compound is a tertiary base) or it is 1 (where the compound is a quaternary ammonium salt or a salt comprising 1 molecule of tertiary base plus 1 equivalent of an acid) or it is 2 (where the compound comprises 1 molecule of base plus 2 equivalents of an acid).

In the compounds of the foregoing formula, Alk represents an alkylene radical such as methylene, ethylene, isopropylene, trimethylene, and like bivalent radicals derived from saturated aliphatic hydrocarbons containing less than 4 carbon atoms. The radical R represents either hydrogen or a lower alkyl radical such as methyl, ethyl, propyl, isopropyl, butyl, isobutyl, and secondary butyl. The radicals R' and R'' represent lower alkyl radicals of the foregoing type; or, taken together with the attached nitrogen, they represent saturated nitrogen-containing heterocyclic radicals such as piperidino, morpholino, and pyrrolidino radicals. The substituent X represents one equivalent of an anion, as remarked, and includes such non-toxic anions as chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like.

The compounds of this invention are useful chemotherapeutic materials in the field of cardiac pathology. In particular, they are valuable because of their digitalis-like activity, showing marked capacity for myocardial stimulation in instances of insufficiency associated with the failing heart.

The amine bases which comprise this invention are relatively insoluble in water, but may be dissolved in dilute acids and in most of the common organic solvents. The acid addition and quaternary ammonium salts of this invention are, on the other hand readily soluble in water and in aqueous solutions of alcohols or other water-miscible organic solvents. The subject compounds may be administered in solid form as tablets or capsules; dissolved in aqueous media, they may be given parenterally.

The compounds to which this invention relates are conveniently prepared starting with the appropriate 3-carboline, which may be obtained by the method of Freak and Robinson as reported in the "Journal of the Chemical Society," 1938, 2014. The 3-carboline is first nitrated—as, for example, by intersection with concentrated nitric acid at temperatures below 45° centigrade for periods of time ranging between 2 and 20 hours—and the resulting 10-nitro compound is then subjected to the action of a reducing agent such as stannous chloride in aqueous hydrochloric acid. At temperatures of 80° to 125° centigrade for from 1 to 4 hours (using stannous chloride and hydrochloric acid), there is obtained a good yield of the 10-aminocarboline derivative which, in turn, is condensed with a haloalkonyl halide—for example, β-chloropropionyl chloride—at temperatures which tend to vary inversely with the reaction time, 100° centigrade for 1 hour being one efficacious combination of temperature and time. The condensation is ordinarily carried out in an inert, non-polar, organic solvent such as dioxane, toluene, methyl ethyl ketone or the like; and an alkaline condensing agent such as potassium carbonate may generally be used to advantage. Finally, the haloalkamidocarboline thus obtained is reacted with a selected lower dialkyl or saturated heterocyclic amine of the type hereinabove defined to give the desired substituted aminoalkamidocarboline. This reaction is ordinarily run at temperatures of 85° to 125° centigrade for periods of time between 6 and 24 hours, using a closed system where the constituent reagents are volatile at the preferred reaction temperature. Conversion of the tertiary bases of this invention to the corresponding acid addition salts is accomplished by simple admixture of the said bases with one or two equivalents of any of various inorganic and strong organic acids, the anionic portion of which conforms to the definition of X as set forth above. Alternatively, the subject bases may be quaternized by addition of an alkyl ester of the formula

R—X where R and X have the meanings hereinabove assigned. Quaternization takes place in the temperature range of 0° to 50° centigrade, using an inert solvent such as chloroform, acetone, methyl ethyl ketone, methanol, butanol, and the like. The reaction is ordinarily completed in from 12 to 48 hours and is generally carried out in a closed system if a lower alkyl halide, such as methyl chloride, is one of the reagents. Using methyl chloride, the reaction may be smoothly effected in chloroform solution at 25° centigrade for 24 hours.

The following examples will illustrate in detail certain of the carboline derivatives which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

A. *10-nitro-3-carboline.*—To 85 parts of concentrated nitric acid at temperatures below 30° C. is added—portion-wise with vigorous agitation—6 parts of 3-carboline. The reactants are maintained for 3½ hours at room temperature with continued agitation, then stored at 2–7° C. overnight. The nearly colorless nitro compound nitrate thus produced is filtered off and, successively, suspended in 100 parts of 30% aqueous ammonium hydroxide, filtered, rinsed well with water, and dried at 75° C. The sulfur colored product may be crystallized from 50 volumes of pyridine to give tiny yellow needles which melt above 315° C.

B. *10-amino-3-carboline.*—A solution of 57 parts of the nitro compound of the foregoing part A and 250 parts of stannous chloride dihydrate in 335 parts of muriatic acid and 1130 parts of water is stirred for 2 hours at reflux temperature. The reaction mixture is cooled and allowed to stand for several hours, following which the tan crystalline tin salt which precipitates is separated, suspended in 1000 parts of 10% aqueous alkali, filtered, rinsed well with water, and dried in vacuo over caustic soda, in that order. Crystallization from 14 volumes of pyridine, using decolorizing charcoal in process, gives the desired 10-amino-3-carboline as small yellow needles, M. P. 263–264° C. Vacuum concentration of the pyridine mother liquor affords a second crop of crystalline product.

C. *10-(β-chloropropionamido)-3-carboline.*—To a stirred refluxing suspension of 69 parts of potassium carbonate and 92 parts of 10-amino-3-carboline in 2000 parts of dioxane is cautiously added 64 parts of β-chloropropionyl chloride. The resultant vigorous reaction is accompanied by copious evolution of carbon dioxide. When the addition is complete, the reactants are maintained for 45 minutes longer at reflux temperature, whereupon the mixture is filtered hot and the filtrate subjected to vacuum distillation to remove solvent. The residue is suspended in 5000 parts of water containing 20 parts of caustic soda. The crude amide is filtered therefrom, then rinsed with water, and finally dried at room temperature. The sand-colored product sinters at about 220° C. and decomposes in the neighborhood of 270° C. Crystallization from 50 volumes of dioxane does not alter this behavior.

D. *10-(β-diethylaminopropionamido)-3-carboline.*—A mixture of 90 parts of the β-chloropropionamido compound of the foregoing part C and 365 parts of diethylamine is heated in a closed vessel at 100–115° C. for 19 hours. Excess diethylamine is then evaporated, and the residual crude amide is taken up in 10% aqueous muriatic acid. Upon addition of 10% aqueous caustic soda, the amide is precipitated as an oil, which crystallizes on standing. The material is recovered on a filter, rinsed thereon with water, and then dried at 75° C. Recrystallization from 4 volumes of ethyl alcohol, using decolorizing charcoal in process gives the desired 10-(β-diethylaminopropionamido)-3-carboline as a pure white product, M. P. approximately 205° C. The compound is soluble in dilute muriatic acid.

E. *10-(β-diethylaminopropionamido)-3-carboline methiodide.*—A solution of 155 parts of 10-(β-diethylaminopropionamido)-3-carboline—prepared according to the technique of the preceding part D—and 71 parts of methyl iodide in 5200 parts of dry chloroform is allowed to react in a closed system for 24 hours at room temperature. The dense yellow crystals so produced are filtered out of the reaction mixture, rinsed on the filter with a little chloroform, and finally dried at room temperature. Crystallization from 6 volumes of methyl alcohol, using decolorizing charcoal in process, gives the desired quaternary salt as tiny yellow crystals, M. P. about 205° C. A mixture of this compound with 10-(β-diethylaminopropionamido)-3-carboline shows M. P. 170° C. The product, moderately soluble in lukewarm water, has the formula

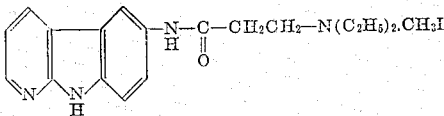

Example 2

*10-(β-diisopropylaminopropionamido)-3-carboline.*—A mixture of 86 parts of the β-chloropropionamido compound of Example 1C and 500 parts of diisopropylamine is heated in a closed vessel at 100–110° C. for 21 hours. Evaporation of excess amine, dissolution of the residue in 10% aqueous muriatic acid, and precipitation of this solution with excess 10% aqueous caustic soda affords a good yield of the desired 10-(β-diisopropylaminopropionamido)-3-carboline. The product is filtered off, then rinsed with water, and finally dried to a tan amorphous powder which proves resistant to crystallization. Continuous extraction with 1600 parts of ethyl alcohol for 3 hours at reflux temperature gives a solution which, treated with decolorizing charcoal and then concentrated to one-fourth volume in vacuo, precipitates, upon cooling, buff-colored crystals of pure product, M. P. 259–260° C. The material is easily soluble in dilute aqueous muriatic acid and has the formula

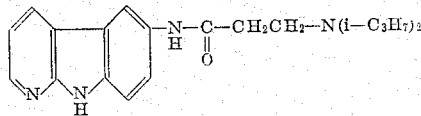

Example 3

*10-(β-N-pyrrolidylpropionamido)-3-carboline.*—Using the same technique employed in Examples 1D and 2, 86 parts of 10-(β-chloropropionamido)-3-carboline is reacted with 350 parts of pyrrolidine to give, in good yield, 10-(β-N-pyrrolidylpropionamido)-3-carboline which, crystallized from 33 volumes of ethyl alcohol, shows M. P. 247–248° C. The pure white product, readily soluble in dilute muriatic acid, has the formula

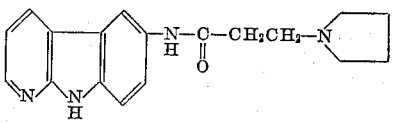

Example 4

A. *10 - chloroacetamido-3-carboline.*—A mixture of 275 parts of 10-amino-3-carboline, prepared according to the technique of Example 1B, and 207 parts of potassium carbonate in 6200 parts of dioxane is brought to reflux temperature. Heating is interrupted while 170 parts of chloroacetyl chloride is cautiously added. Heating is resumed as necessary to maintain reflux for 1 hour, following which the hot reaction mixture is filtered and the filtrate subjected to vacuum distillation to remove solvent. The residue is suspended in 12,000 parts of water containing 65 parts of caustic soda. Insoluble material is filtered out, rinsed with water, and finally dried at room temperature. The buff-colored solid thus obtained is the desired 10-chloroacetamido-3-carboline.

B. *10-diethylaminoacetamido - 3 - carboline.*—Condensation of the chloroacetamido compound of the foregoing part A with diethylamine is accomplished by the technique of Example 1D, 175 parts of the chloro compound and 75 parts of the amine being heated together in a sealed reactor for 24 hours at 90° C. The product is worked up as before. Evaporation of excess amine, dissolution of the residue in dilute mineral acid, and alkalinization of this solution with 25% aqueous caustic soda precipitates the desired amide, which, separated and dried at 75° C., may be crystallized, if desired, from aqueous alcohol. The 10-diethylaminoacetamido-3-carboline thus obtained is soluble in dilute muriatic acid and has the formula

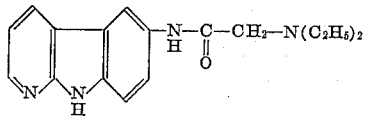

Example 5

A. *1-(4'-methyl-2'-pyridyl) - benzotriazole.*—A mixture of 86 parts of 2-bromo-4-methylpyridine, 54 parts of o-phenylenediamine, and 2 parts of copper powder is heated in a jacketed vessel for 4 hours at 140–155° C. (jacket temperature) under an absolute pressure of 40 mm. of mercury. The mixture, which refluxes gently at first, gradually becomes more viscous and ceases reflux as the reaction progresses. The semisolid product is dissolved in 260 parts of hot alcohol; and 1250 parts of 10% aqueous muriatic acid is then added, whereupon the copper is filtered out and a solution of 63 parts of sodium nitrite in 630 parts of water is then added very slowly at 5–10° C. to the stirred filtrate. Following addition of the sodium nitrite, stirring is continued for 1 hour longer at 5° C., after which the reactants are allowed to warm to room temperature overnight. The gray precipitate which has formed is, successively, recovered on a filter, rinsed thereon with water, and dried at room temperature. The product thus obtained is 1-(4'-methyl-2'-pyridyl)-benzotriazole, M. P. 117–118° C. Crystallization from 20 volumes of methyl alcohol gives pale gray needles, M. P. approximately 118° C.

B. *6-methyl-3-carboline.*—A stirred solution of 81 parts of the triazole of the preceding part A in 700 parts of phosphoric acid is cautiously heated to 150° C. Moderate evolution of nitrogen occurs. Temperature of the reactants is slowly increased to 200° C. over a period of 30 minutes, by the end of which time nitrogen evolution practically ceases. The materials are heated and stirred for 15 minutes longer at 200–205° C., at which point the mixture is cooled to 25° C. and a hot solution of 160 parts of picric acid in 2000 parts of alcohol, followed by 830 parts of hot water, is then added. Overnight refrigeration promotes precipitation of the picrate, which is filtered off and then suspended in 4800 parts of 8% aqueous caustic soda at approximately 75° C. The crude methylcarboline which separates is recovered on a filter and rinsed thereon with hot water until the washings are substantially free of color. Upon drying at 75° C., a gray amorphous powder is obtained which is subjected to continuous extraction with 400 parts of boiling alcohol for 24 hours. Upon separating and cooling the extract, brown crystals are precipitated which, recovered on a filter and dried at 75° C., show M. P. 212–213° C. A further 320 parts of alcohol is added to the extraction residue, and the mixture is allowed to boil for 20 minutes. The mixture is then filtered, and this filtrate is combined with that from the precipitation above. Vacuum concentration of the combined filtrates to about one-tenth of the original volume gives a second crop of crystals, pale yellow in color, M. P. about 215° C. Recrystallization of the two crops of crystals from 40 volumes of methyl alcohol gives nearly colorless 6-methyl-3-carboline, the M. P. of which remains unchanged.

C. *6 - methyl-10-nitro-3-carboline.*—Nitration of 14 parts of 6-methyl-3-carboline by interaction with 200 parts of concentrated nitric acid according to the technique of Example 1A gives a good yield of the high-melting (greater than 315° C.) 6-methyl-10-nitro-3-carboline. Crystallized from 30 volumes of pyridine, the product is bright yellow in color.

D. *10 - amino-6-methyl-3-carboline.*—Reduction of 120 parts of the nitro compound of the foregoing part C is accomplished with 498 parts of stannous chloride dihydrate by the method of Example 1B. The crude amine is crystallized from 45 volumes of ethyl alcohol, using decolorizing charcoal in process, to give minute yellow crystals, M. P. 245–247° C.

E. *10 - (β - chloropropionamide)-6-methyl-3-carboline.*—Interaction of 95 parts of 10-amino-6-methyl-3-carboline, 61 parts of β-chloropropionyl chloride, and 66 parts of potassium carbonate, using dioxane as the reaction medium and following the procedure detailed in Example 1C, gives a good yield of 10-(β-chloropropionamido)-6-methyl-3-carboline which may be condensed with diethylamine as described in the succeeding part F without further treatment.

F. *10 - (β - diethylaminopropionamido) - 6 - methyl-3-carboline.*—A mixture of 65 parts of 10 - (β-chloropropionamido)-6-methyl-3-carboline and 356 parts of diethylamine is heated in a closed vessel for 14 hours at approximately 100° C. Workup of the reaction product in accordance with the technique of Example 1D affords a good yield of the desired diethylaminopropionamido compound which, after crystallization from 30 volumes of toluene and then from 80 volumes of ethyl acetate, is obtained as colorless needles, M. P. approximately 229° C. The product is readily soluble in dilute muriatic acid.

G. *10 - (β - diethylaminopropionamido) - 6 - methyl - 3-carboline ethiodide.*—Following the procedure of Example 1E, 10-(β-diethylaminopropionamido)-6-methyl-3-carboline is quaternized by reacting 162 parts thereof together with 78 parts of ethyl iodide in 700 parts of dry chloroform, maintaining the reagents in a closed system to prevent evaporation losses. After 24 hours, the solvent is stripped in vacuo; and 2500 parts of anhydrous ether is then added. The desired product is obtained as a viscous oil which granulates on standing. It has the formula

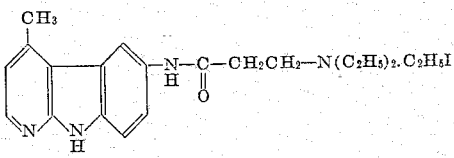

*Example 6*

A. *10 - (γ - chloro-n-butyrylamido)-6-methyl-3-carboline.*—A mixture of 197 parts of 10-amino-6-methyl-3-carboline (obtainable by the method of Example 5, parts A through D) and 138 parts of potassium carbonate in 4000 parts of dioxane is heated, with stirring, to reflux temperature. Heating is interrupted while 141 parts of γ-chlorobutyryl chloride is cautiously added. When the resulting vigorously exothermic reaction subsides, heating is resumed as necessary to maintain reflux for 45 minutes, stirring being continued throughout. The reaction mixture is then filtered while hot and the filtrate subjected to vacuum distillation to remove solvent. The residue is suspended in very dilute aqueous base and the crude amide filtered therefrom. The 10-(γ - chloro - n-butyrylamido)-6-methyl-3-carboline thus obtained may, after rinsing with water and drying at room temperatures, be crystallized to effect further purification as required.

B. *10 - (γ-diisopropylamino-n-butyrylamido)-6-methyl-3-carboline.*—The chloroamide of the preceding part A may be converted to the diisopropylaminoamide in accordance with the method of Example 2. By this procedure, 120 parts of the chloroamide is reacted in a closed vessel at 100-110° C. with 750 parts of diisopropylamine, the reaction time being 22 hours. Excess amine is then evaporated. The residue is taken up in dilute muriatic acid, then precipitated by addition of 25% aqueous caustic soda. The crude product, isolated by filtration, is recrystallized from alcohol, using decolorizing charcoal in process. The 10-(γ-diisopropylamino-n-butyrylamido)-6-methyl-3-carboline so obtained is easily soluble in dilute muriatic acid. It has the formula

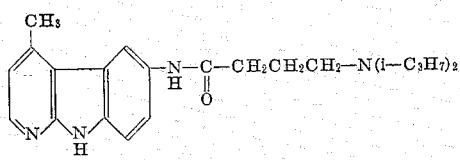

*Example 7*

A. *1 - (6'-methyl-2'-pyridyl)-benzotriazole.*—A mixture of 179 parts of 6-methyl-2-bromopyridine and 112 parts of o-phenylenediamine is heated in the presence of 4 parts of copper powder according to the technique of Example 5A. The reaction product—following addition of 525 parts of hot alcohol, acidification with 2500 parts of 10% aqueous muriatic acid, and filtering out of the copper—is diazotized with 125 parts of sodium nitrite to give, in good yield, the desired 1-(6' - methyl - 2' - pyridyl)-benzotriazole, M. P. 84-85° C.

B. *4-methyl-3-carboline.*—Following the procedure of Example 5B, 165 parts of 1-(6'-methyl-2'-pyridyl)-benzotriazole and 1410 parts of 85% phosphoric acid are reacted together; and the product is treated with a hot alcoholic solution of picric acid to give the crude carboline picrate. The picrate is treated with 8% aqueous caustic soda to yield the crude methylcarboline. The methylcarboline, in turn, is first extracted for 15 minutes with 2400 parts of boiling alcohol, and then, following precipitation (on cooling) and recovery from this extract of an initial crop of crystals melting at 254-255° C., is re-extracted for 10 minutes with the boiling crystallization mother liquors. Vacuum concentration of these mother liquors to one-sixth the original volume affords an additional crop of crystals, M. P. about 255° C. The desired 4-methyl-3-carboline is obtained in the form of pearl gray plates.

C. *4-methyl-10-nitro-3-carboline.* — Nitration of 15 parts of 4-methyl-3-carboline with 107 parts of concentrated nitric acid—essentially as described in Example 1A—gives a good yield of sulfur-colored nitro compound, M. P. above 350° C. The product may be crystallized from 50 volumes of pyridine as fine yellow needles.

D. *10-amino-4-methyl-3-carboline.*—Reduction of 85 parts of the nitro compound of the preceding part C with 349 parts of stannous chloride dihydrate, using the technique detailed in Example 1B, gives the desired 10-amino-4-methyl-3-carboline which, crystallized from 150 volumes of alcohol, shows M. P. 290° C. The product comes out as tiny, colorless needles.

E. *10-(β-chloropropionamido) - 4 - methyl-3-carboline.*—Following the procedure of Example 1C, 73 parts of 10-amino-4-methyl-3-carboline, 45 parts of β-chloropropionyl chloride, and 48 parts of potassium carbonate are reacted together to give a good yield of 10-(β-chloropropionamido)-4-methyl-3-carboline which is sufficiently pure for use in the ensuing part F without recrystallization.

F. *4 - methyl-10-(β-piperidylpropionamido)-3-carboline.*—The crude chloroamido compound of Example 7E is converted to the piperidylamide by refluxing a mixture of 93 parts of the chloroamide with 1290 parts of piperidine. The mixture is then chilled, and the crystalline product so precipitated is filtered out and dissolved in excess dilute muriatic acid. Upon making alkaline with 25% aqueous caustic soda, the desired piperidylamide is thrown down. Filtered, rinsed with water and dried at 75° C., the sand-colored product is crystallized from 65 volumes of alcohol, using decolorizing charcoal in process, to give white crystals of 4-methyl-10-(β-piperidylpropionamido)-3-carboline, M. P. about 252° C. The product is readily soluble in dilute muriatic acid.

G. *4-methyl-10-(β-piperidylpropionamido)-3-carboline methiodide.*—A mixture of 168 parts of the tertiary base of Example 7F, 71 parts of methyl iodide, and 22,350 parts of chloroform is stored in a closed vessel for 24 hours at room temperature. The crop of shiny needles so produced is filtered off and recrystallized from methyl alcohol (using decolorizing charcoal) to give buff colored needles of 4-methyl-10-(β-piperidylpropionamido)-3-carboline methiodide, M. P. approximately 225° C. Moderately soluble in warm water, it has the formula

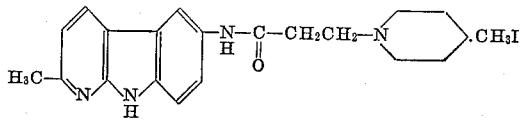

Example 8

A. 5 - (β - chloropropionamido)-3,4,5,6,-tetrahydro-5-carboline.—A mixture of 76 parts of 3,4,5,6,-tetrahydro-5-carboline—obtained by the method of Robinson and Thornley, "Journal of the Chemical Society," 1924, 2174—56 parts of β-chloropropionyl chloride, and 61 parts of potassium carbonate are reacted together according to the technique of Example 1C, using dioxane as the reaction medium. The product, 5-(β-chloropropionamido) - 3,4,5,6 - tetrahydro-5-carboline, is obtained as a tan solid.

B. 5 - (β-piperidylpropionamido)-3,4,5,6-tetrahydro-5-carboline.—The chloro compound obtained in the foregoing part A is refluxed with 430 parts of piperidine for 21 hours. Vacuum distillation of excess pyridine, dissolution of the residue in dilute aqueous muriatic acid, and reprecipitation with excess 25% aqueous caustic soda gives a good yield of somewhat tacky crude product which, crystallized from 10 volumes of benzene, comes down as white crystals, M. P. 174-175° C. The 5-(β-piperidylpropionamido)-3,4,5,6-tetrahydro-5-carboline obtained by this procedure has the formula

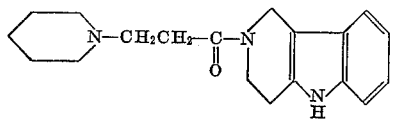

I claim:

1. A member of the group consisting of compounds of the formula

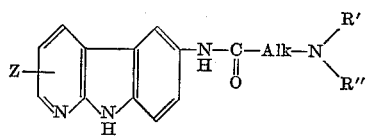

and non-toxic salts thereof, wherein Z is selected from the group consisting of hydrogen and a methyl radical, Alk is a lower alkylene radical containing not more than 3 carbon atoms, and NR'R'' is selected from the group consisting of lower dialkylamino, piperidino, pyrrolidino, and morpholino radicals.

2. A dialkylaminoalkamido-3-carboline having the formula

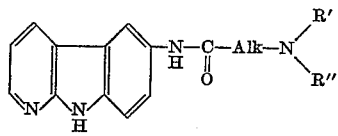

wherein Alk is a lower alkylene radical containing not more than 3 carbon atoms, and R' and R'' are lower alkyl radicals.

3. A dialkylaminopropionamido - 3 - carboline having the formula

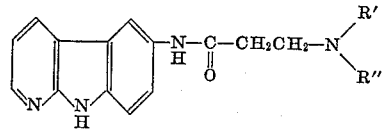

wherein R' and R'' are lower alkyl groups.

4. 10 - (β - diethylaminopropionamido)-3-carboline.

5. 10 - (β - diisopropylaminopropionamido)-3-carboline.

6. 10 - (β - N-pyrrolidylpropionamido)-3-carboline.

7. A dialkylaminoalkamido - 6 - methyl-3-carboline having the formula

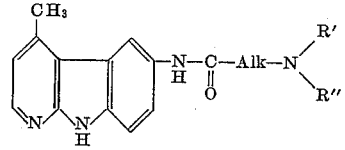

wherein Alk is a lower alkylene radical containing not more than 3 carbon atoms, and R' and R'' are lower alkyl groups.

8. A dialkylaminopropionamido-6-methyl-3-carboline having the formula

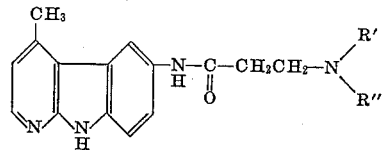

wherein R' and R'' are lower alkyl groups.

9. 10 - (β-diethylaminopropionamido)-6-methyl-3-carboline.

10. A piperidylalkamido-4-methyl-3-carboline having the formula

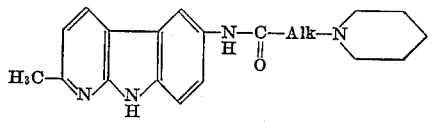

wherein Alk is a lower alkylene group containing not more than 3 carbon atoms.

11. 4-methyl-10-(β-piperidylpropionamido)-3-carboline.

No references cited.